United States Patent [19]

Sorensen

[11] Patent Number: 4,867,672

[45] Date of Patent: Sep. 19, 1989

[54] REDUCTION OF REQUIRED MOLD-CAVITY CLAMPING FORCE AND CONTROL OF INJECTION-MOLDED PRODUCT WALL THICKNESS

[75] Inventor: Jens O. Sorensen, Rancho Santa Fe, Calif.

[73] Assignee: Primtec, Rancho Santa Fe, Calif.

[21] Appl. No.: 201,690

[22] Filed: Jun. 2, 1988

[51] Int. Cl.$^4$ .............................................. B29C 45/36
[52] U.S. Cl. ................................ 425/577; 264/328.7; 264/328.8; 264/328.13; 425/DIG. 5; 425/DIG. 129
[58] Field of Search ................. 264/250, 328.1, 328.8, 264/328.7, 328.12, 328.13, 328.14, 328.16, 294; 425/542, 555, 577, DIG. 5, DIG. 129

[56] References Cited

U.S. PATENT DOCUMENTS

| | | |
|---|---|---|
| 3,305,892 | 2/1967 | Heider . |
| 3,473,197 | 10/1969 | Wilds et al. . |
| 3,509,603 | 5/1970 | Halsall et al. . |
| 3,564,660 | 2/1971 | Darnell . |
| 3,737,272 | 6/1973 | Segmuller . |
| 3,767,156 | 10/1973 | Sullivan et al. ...................... 249/107 |
| 4,128,381 | 12/1975 | Bonis ................................... 425/468 |
| 4,146,600 | 3/1979 | Elly et al. ............................. 264/39 |
| 4,184,835 | 1/1980 | Talbot ................................... 425/808 |
| 4,381,275 | 4/1983 | Sorensen ........................... 264/328.8 |
| 4,470,786 | 9/1984 | Sano et al. .......................... 425/125 |
| 4,508,676 | 4/1985 | Sorensen ........................... 264/328.8 |

FOREIGN PATENT DOCUMENTS

17577/70  1/1972  Australia .
962726   6/1950  France .

Primary Examiner—Jan H. Silbaugh
Assistant Examiner—Jill L. Heitbrink
Attorney, Agent, or Firm—Edward W. Callan

[57] ABSTRACT

A system for injection molding a hollow, plastic product having an end wall and a cylindrical or approximately cylindrical side wall, wherein the end wall includes a fringe region bordering the end wall. The system includes a mold-cavity-forming combination of a core section and a cavity section, wherein the core section includes a protractable and retractable ram-shaped contact element, with the end of the contact element that faces the mold cavity including a contact surface that contacts at least a significant part of the fringe region of the end-wall-defining portion of the cavity section. When the contact element is protracted to a forward position so that the contact surface contacts the cavity section, the area of the mold cavity as projected on a plane perpendicular to the mold opening direction is reduced, which thus reduces the clamping force required during the injection of plastic material. At least part of the contact surface is non-perpendicular to the longitudinal axis of the cavity section and contacts at least part of the fringe region of the end-wall-defining portion of the cavity section when the contact element is protracted to impede lateral movement of the core section in relation to the longitudinal axis of the cavity section. This feature controls the wall thickness of the cavity. A first quantity of plastic material is injected into the mold cavity while the contact element is held in the forward position. The contact element is then retracted to a rear position where the contact surface ceases to contact the cavity section, while the injected first quantity of plastic material at least partly solidifies to further reduce the required clamping force and to further prevent relative movement between the core section and the cavity section when a second quantity of plastic material is injected into the mold cavity to complete formation of the plastic product.

9 Claims, 2 Drawing Sheets 4,867,672

REDUCTION OF REQUIRED MOLD-CAVITY CLAMPING FORCE AND CONTROL OF INJECTION-MOLDED PRODUCT WALL THICKNESS

BACKGROUND OF THE INVENTION

The present invention generally pertains to injection molding of hollow plastic products and is particularly directed to systems and methods for reducing the required mold-cavity clamping force and for controlling the wall thickness of a molded product having an end wall and a cylindrical or approximately cylindrical side wall, wherein the end wall includes a fringe region bordering the sidewall.

One prior art, method for injection molding such a product includes the steps of (a) forming a mold cavity by combining a core section for forming the inside surface of the product with a cavity section for forming the outside surface of the product, wherein the core section or cavity section includes a protractable and retractable ram-shaped contact element, with the end of the contact element that faces the mold cavity including a contact surface;

(b) protracting the contact element to a forward position so that the contact surface contacts the cavity section or core section of the mold cavity respectively;

(c) injecting a first quantity of plastic material into the mold cavity while the contact element is in the forward position;

(d) retracting the contact element to a rear position where the contact surface ceases to contact the cavity section or core section of the mold cavity respectively;

(e) injecting a second quantity of plastic material into the mold cavity while the contact element is in the rear position.

Also in the prior art, the wall thickness of an injection molded plastic product is controlled by a method including the steps of (a) forming a mold cavity by combining a core section for forming the inside surface of the product with a cavity section for forming the outside surface of the product, wherein the core section or cavity section includes a protractable and retractable ram-shaped contact element, with the end of the contact element that faces the mold cavity including a contact surface;

(b) protracting the contact element to a forward position so that the contact surface contacts the cavity section or core section of the mold cavity respectively, to secure the core section in position in relation to the cavity section in order to impede movement of the core section in relation to the cavity section;

(c) injecting a first quantity of plastic material into the mold cavity while the contact element is in the forward position, whereby the wall thickness of the cavity is controlled because relative movement between core section and the cavity section is impeded;

(d) retracting the contact element to a rear position where the contact surface ceases to contact the cavity section or core section of the mold cavity respectively, while the injected first quantity of plastic material at least partly solidifies to impede movement of the core section in relation to the cavity section and thus control the wall thickness of the cavity during further injection of plastic material into the mold cavity; and (e) injecting a second quantity of plastic material into the mold cavity while the contact element is in the rear position.

SUMMARY OF THE INVENTION

The present invention provides an improved injection molding system which may be used for performing a method of injection molding a hollow, plastic product having an end wall and a cylindrical or approximately cylindrical side wall, wherein the end wall includes a fringe region bordering the sidewall, wherein the mold clamping force required during the injection of plastic material into the mold is reduced; and for performing a method of injection molding such a hollow, plastic product, wherein the wall thickness of the product is controlled.

The injection molding system of the present invention includes a mold-cavity-forming combination of a core section for forming the inside surface of the product and a cavity section for forming the outside surface of the product, with the axis of the cylindrical or approximately cylindrical side-wall defining portion of the mold cavity being the same as the mold-opening direction, wherein the core section includes a protractable and retractable ram-shaped contact element, with the end of the contact element that faces the mold cavity including a contact surface; means for protracting the contact element to a forward position so that the contact surface contacts the cavity section of the mold cavity; means for injecting a first quantity of plastic material into the mold cavity while the contact element is in the forward position; means for retracting the contact element to a rear position where the contact surface ceases to contact the cavity section of the mold cavity; and means for injecting a second quantity of plastic material into the mold cavity while the contact element is in the rear position; wherein the contact element has a contact surface that is able to contact at least a significant part of the fringe region of the end-wall-defining portion of the cavity section, so that when the contact element is protracted to a forward position the contact surface contacts at least a significant part of the fringe region of the end-wall-defining portion of the cavity section of the mold cavity, to thereby reduce the mold cavity area as projected on a plane perpendicular to the mold opening direction, and thus reduce the clamping force required when the first quantity of plastic material is injected into the mold cavity; and wherein both the end-wall defining portion and the side-wall defining portion of the core section consist of the contact element.

This system may be used to perform a method of injection molding such a hollow, plastic product, wherein the mold clamping force required during the injection of plastic material into the mold is reduced. Such method includes the steps of (a) forming a mold cavity by combining a core section for forming the inside surface cf the product with a cavity section for forming the outside surface of the product, with the axis of the cylindrical or approximately cylindrical side-wall defining portion of the mold cavity being the same as the mold-opening direction, wherein the core section includes a protractable and retractable ram-shaped contact element, with the end of the contact element that faces the mold cavity including a contact surface;

(b) protracting the contact element to a forward position so that the contact surface contacts the cavity section of the mold cavity;

(c) injecting a first quantity of plastic material into the mold cavity while the contact element is in the forward position;

(d) retracting the contact element to a rear position where the contact surface ceases to contact the cavity section of the mold cavity; and (e) injecting a second quantity of plastic material into the mold cavity while the contact element is in the rear position;

wherein step (a) comprises the step of (f) forming the mold cavity with a contact element having a contact surface that is able to contact at least a significant part of the fringe region of the end-wall-defining portion of the cavity section;

wherein step (b) comprises the step of (g) protracting the contact element to a forward position so that the contact surface contacts at least a significant part of the fringe region of the end-wall-defining portion of the cavity section of the mold cavity, to thereby reduce the mold cavity area as projected on a plane perpendicular to the mold opening direction and thus reduce the clamping force required when the first quantity of plastic material is injected into the mold cavity; and wherein step (a) further comprises the step of (h) forming the mold cavity by combining the cavity section with a core section in which both the end-wall defining portion and the side-wall-defining portion of the core section consist of the contact element.

In an embodiment of the present invention, wherein the method is used to control the wall thickness of the product, step (b) comprises the step of (i) protracting the contract element to a forward position so that the contact surface contacts the cavity section of the mold cavity to secure the core section in position in relation to the cavity section in order to impede movement of the core section in relation to the cavity section;

step (c) comprises the step of (j) injecting a first quantity of plastic material into the mold cavity while the contact element is in the forward position, whereby the wall thickness of the mold cavity is controlled because relative movement between the core section and the cavity section is impeded; and step (d) comprises the step of (k) retracting the contact element to a rear position where the contact surface ceases to contact the cavity section of the mold cavity, while the injected first quantity of plastic material at least partly solidifies to impede movement of the core section in relation to the cavity section and thus control the wall thickness of the cavity during further injection of plastic material into the mold cavity.

In a separate aspect of the present invention directed to controlling the wall thickness of a molded product, a method of injection molding a hollow, plastic product having an end wall and a cylindrical or approximately cylindrical side wall, wherein the end wall includes a fringe region bordering the side wall, includes the steps of (a) forming a mold cavity by combining a core section with a cavity section for forming said product, wherein the core section includes a protractable and retractable contact element, with the end of the contact element that faces the mold cavity including a contact surface;

(b) protracting the contact element along a longitudinal axis of the cavity section to a forward position so that the contact surface contacts the cavity section;

(c) injecting a first quantity of plastic material into the mold cavity while the contact element is in the forward position;

(d) retracting the contact element to a rear position where the contact surface ceases to contact the cavity section of the mold cavity; and (e) injecting a second quantity of plastic material into the mold cavity while the contact element is in the rear position;

wherein step (a) comprises the step of (f) forming the mold cavity by combining the cavity section with a core section in which both the end-wall defining portion and the side-wall-defining portion of the core section consist of the contact element;

wherein step (a) further comprises the step of (g) forming the mold cavity with a contact element having a contact surface, at least part of which contact surface is non-perpendicular to the longitudinal axis of the cavity section, and which non-perpendicular part of the contact surface is able to contact at least part of the fringe region of the end-wall-defining portion of the cavity section when the contact element is protracted; and wherein step (b) comprises the step of (h) protracting the contact element to a forward position so that the nonperpendicular part of the contact surface contacts at least part of the fringe region of the end-wall-defining portion of the cavity section to secure the core section in position in relation to the cavity section in order to impede lateral movement of the core section in relation to the longitudinal axis of the cavity section.

The present invention further provides a system for practising such method.

Additional features of the present invention are described in relation to the description of the preferred embodiment.

DESCRIPTION OF THE PREFERRED EMBODIMENT

Figure 1:
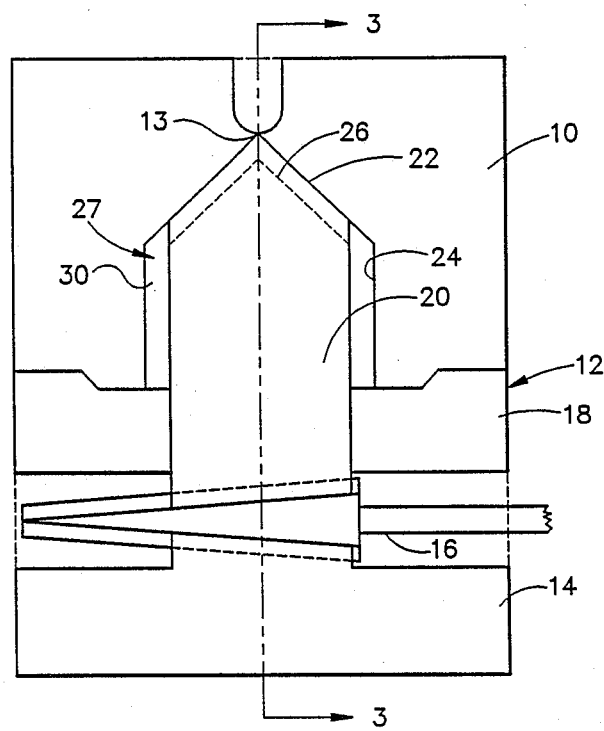
FIG. 1 is a sectional view of a preferred embodiment of the system of the present invention, with the contact element in a protracted position.

Referring to the Drawing, a preferred embodiment of the injection molding system of the present invention includes a cavity section 10, a core section 12, a gate 13, a stationary base member 14, a slidable wedge-shaped member 16 and spacing bars 17. The core section 12 includes a mating element 18; and one wall of the core section 12 includes a protractable and retractable ram-shaped contact element 20. The end of the contact element 20 that faces the cavity section 10 has a contact surface 22. The cavity section 10 and core section 12 are combined to define a mold cavity 24.

The core section 12 and the stationary base member are maintained in a fixed position in relation to each other by the spacing bars 17.

Figure 3:
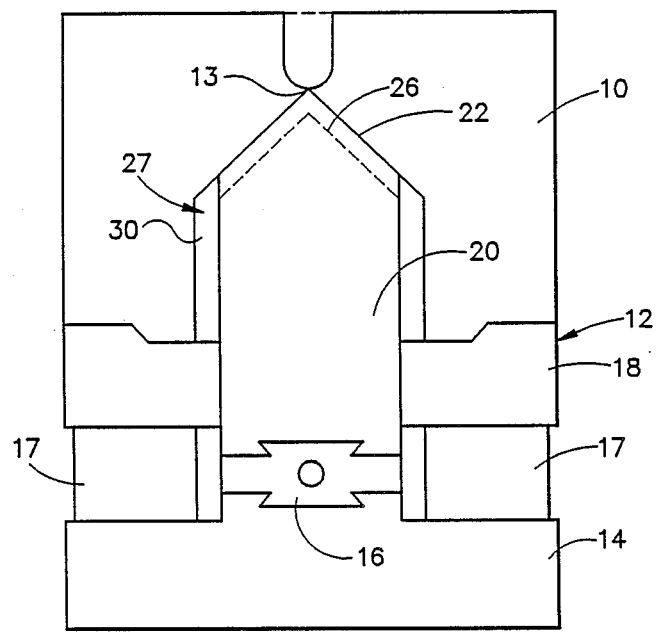
FIG. 3 is a sectional view of the preferred embodiment taken along line 3—3 in FIG. 1.

The wedge-shaped member 16 has a dove-tail-shaped lateral cross section, as shown in FIG. 3; and the contact element 20 and the stationary base member 14 have corresponding dove-tail-shaped slots for receiving the wedge-shaped member 16 so that the wedge-shaped member 16 is slidably and retentatively coupled to both the contact element 20 and the stationary base member 14. Accordingly, protraction of the wedge-shaped member 16 causes the contact element 20 to be protracted; and retraction of the wedge-shaped member 16 causes the contact element 20 to be retracted.

Figure 4:
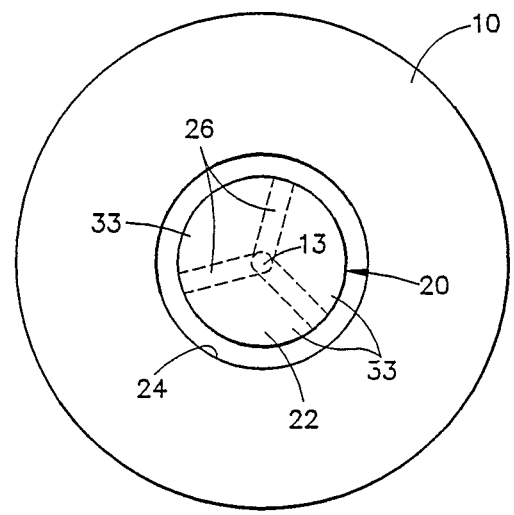
FIG. 4 is a sectional view of the preferred embodiment taken along line 4—4 in FIG. 2.

Referring to FIG. 4, the contact surface 22 of the contact element 20 has a generally conical shape and includes a plurality of flow channels 26, which extend radially from the apex of the cone. The wall-defining portions of the core section 12 consist of the contact element 20.

Figure 2:
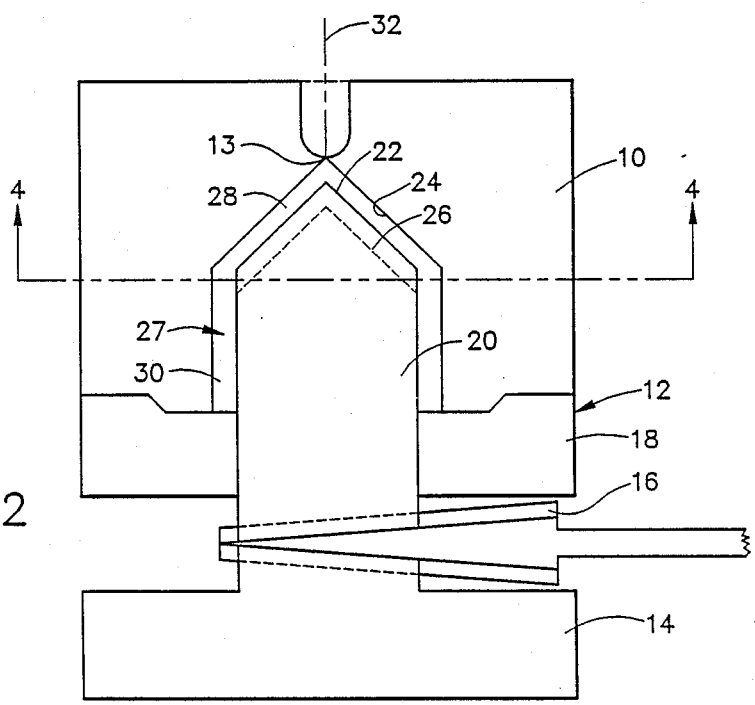
FIG. 2 is a sectional view of a preferred embodiment of the system of the present invention, with the contact element in a retracted position.

Referring to FIG. 2, the mold cavity 24 defines a hollow, plastic product 27 having a generally conical end wall 28 and a cylindrical or approximately cylindrical side wall 30. The axis 32 of the cylindrical or approximately cylindrical side-wall defining portion of the mold cavity 24 is the same as the mold-opening direction.

The system illustrated in the Drawing is used to perform the methods of the present invention in the following manner.

Referring to FIG. 2, the mold cavity 24 is formed by combining the core section 12 with the cavity section 10. The core section 12 forms the inside surface of the product 27 defined by the mold cavity 24 and the cavity section 10 forms the outside surface of the product.

The slidable wedge-shaped member 16 is protracted between the contact element 20 and the stationary base member 14 to forcefully protract the contact element 20 to a forward position so that the contact surface 22 contacts the cavity section 10, to thereby reduce the area of the mold cavity 24 as projected on a plane perpendicular to the mold opening direction and thus reduce the clamping force required during the injection of plastic material into the mold cavity 24. When the contact element 20 is protracted to the forward position, as shown in FIGS. 1 and 3, the contact surface 22 covers approximately the complete end-wall-defining portion of the cavity section 10 to thereby reduce the mold cavity area as projected on a plane perpendicular to the mold opening direction to approximately the cross-sectional area of the side-wall-defining portion of the mold cavity, which is relatively small because the product 27 has a cylindrical or approximately cylindrical side wall 30.

Protracting the contact element 20 to a forward position so that the contact surface 22 contacts the cavity section 10 also rigidly secures the core section 12 in position in relation to the cavity section 10 in order to impede movement of the core section 12 in relation to the cavity section 10.

A first quantity of plastic material is injected into the mold cavity 24 from the gate 13 and through the flow channels 26 in the contact surface 22 of the contact element 20 while the contact element 20 is held in the forward position by the wedge-shaped member 16. Because the mold cavity volume has been reduced to the relatively small volume of the cylindrical or approximately cylindrical side wall 30, the clamping force required when the first quantity of plastic material is injected into the mold cavity 24 is minimized.

Also the wall thickness of the mold cavity 24 is controlled during injection of the first quantity of plastic material because relative movement between core section 12 and the cavity section 10 is impeded by the contact element 20 contacting the cavity section 10, as described above.

The slidable wedge-shaped member 16 is then retracted to cause the contact element 20 to be retracted to a rear position, as shown in FIG. 2, where the contact surface 22 ceases to contact the cavity section 10; while the injected first quantity of plastic material at least partly solidifies to thereby reduce the clamping force required during further injection of plastic material into the mold cavity 24.

The at-least-partly-solidified plastic material also impedes movement of the core section 12 in relation to the cavity section 10 and thus controls the wall thickness of the mold cavity 24 during further injection of plastic material into the mold cavity 24.

A second quantity of plastic material is injected into the mold cavity 24 while the contact element 20 is held in the rear position by the wedge-shaped member 16. The second quantity of plastic material is injected into the mold cavity 24 at a lower pressure than the first quantity of plastic material in order to further reduce the required clamping force. This completes formation of the plastic product 27. After the product 27 is solidified, the mold is opened and the product 27 is ejected. The above-described cycle is then repeated.

I claim:

1. A system for injection molding a hollow, plastic product having an end wall and a cylindrical or approximately cylindrical side wall, wherein the end wall includes a fringe region bordering the end wall, the system comprising a mold-cavity-forming combination of a core section for forming the inside surface of the product with a cavity section for forming the outside surface of the product, with the axis of the cylindrical or approximately cylindrical sidewall defining portion of the mold cavity being the same as the mold-opening direction, wherein the core section includes a protractable and retractable contact element, with the end of the contact element that faces the mold cavity including a contact surface;

means for protracting the contact element to a forward position so that the contact surface contacts the cavity section of the mold cavity;

means for injecting a first quantity of plastic material into the mold cavity while the contact element is in the forward position;

means for retracting the contact element to a rear position where the contact surface ceases to contact the cavity section of the mold cavity; and means for injecting a second quantity of plastic material into the mold cavity while the contact element is in the rear position;

wherein the contact surface is able to contact at least a significant part of the fringe region of the end-wall-defining portion of the cavity section, so that when the contact element is protracted to a forward position the contact surface contacts at least a significant part of the fringe region of the end-wall-defining portion of the cavity section of the mold cavity, to thereby reduce the mold cavity area as projected on a plane perpendicular to the mold opening direction, and thus reduce the clamping force required when the first quantity of plastic material is injected into the mold cavity; and wherein both the end-wall defining portion and the side-wall defining portion of the core section consist of the contact element.

2. A system according to claim 1, wherein the means for injecting the second quantity of plastic material includes means for injecting the second quantity of plastic material at a lower pressure than the first quantity of plastic material in order to further reduce the required clamping force.

3. A system according to claim 1, wherein the means for protracting the contract element to a forward position so that the contact surface contacts the cavity section of the mold cavity secures the core section in position in relation to the cavity section in order to impede movement of the core section in relation to the cavity section;

the means for injecting a first quantity of plastic material into the mold cavity while the contact element is in the forward position controls the wall thickness of the mold cavity because relative movement between the core section and the cavity section is impeded; and the injected first quantity of plastic material at least partly solidifies to impede movement of the core section in relation to the cavity section and thus controls the wall thickness of the cavity during further injection of plastic material into the mold cavity.

4. A system according to claim 3, comprising a slidable wedge-shaped member;

means for protracting the wedge-shaped member between the contact element and the stationary base member to forcefully protract the contact element to the forward position; and means for retracting the wedge-shaped member so that the contact element may be retracted.

5. A system according to claim 4, wherein the wedge-shaped member is slidably and retentatively coupled to both the contact element and the stationary base member so that retraction of the wedge-shaped member causes the contact element to be retracted.

6. A system for injection molding a hollow, plastic product having an end wall and a cylindrical or approximately cylindrical side wall, wherein the end wall includes a fringe region bordering the side wall, the system comprising a mold-cavity-forming combination of a core section and a cavity section for forming a mold cavity by combining the core section with the cavity section for forming said product, wherein the core section includes a protractable and retractable contact element, with the end of the contact element that faces the mold cavity including a contact surface;

means for protracting the contact element along a longitudinal axis of the cavity section to a forward position so that the contact surface contacts the cavity section;

means for injecting a first quantity of plastic material into the mold cavity while the contact element is in the forward position;

means for retracting the contact element to a rear position where the contact surface ceases to contact the cavity section; and means for injecting a second quantity of plastic material into the mold cavity while the contact element is in the rear position;

wherein both the end-wall defining portion and the side-wall defining portion of the core section consist of the contact element;

wherein the contact element has a contact surface, at least part of which contact surface is non-perpendicular to the longitudinal axis of the cavity section, and which non-perpendicular part of the contact surface is able to contact at least part of the fringe region of the end-wall-defining portion of the cavity section when the contact element is protracted; and wherein the protracting means include means for protracting the contact element to a forward position so that the non-perpendicular part of the contact surface contacts at least part of the fringe region of the end-wall-defining portion of the cavity section to secure the core section in position in relation to the cavity section in order to impede lateral movement of the core section in relation to the longitudinal axis of the cavity section while the first quantity of plastic material is being injected into the mold cavity.

7. A system according to claim 6, comprising wherein the means for injecting said first quantity of plastic material include means for injecting said first quantity of plastic material into the mold cavity while the contact element is in the forward position, whereby the wall thickness of the mold cavity is controlled because lateral movement of the core section in relation to the cavity section is impeded by said contact between the non-perpendicular part of the contact surface and the fringe region of the endwall defining portion of the cavity section; and wherein the retracting means include means for retracting the contact element to a rear position where the contact surface ceases to contact the cavity section of the mold cavity, while the injected first quantity of plastic material at least partly solidifies to impede lateral movement of the core section in relation to the longitudinal axis of the cavity section and thus control the wall thickness of the mold cavity during further injection of plastic material into the mold cavity.

8. A system according to claim 6, comprising a slidable wedge-shaped member;

means for protracting the wedge-shaped member between the contact element and the stationary base member to forcefully protract the contact element to the forward position; and means for retracting the wedge-shaped member so that the contact element may be retracted.

9. A system according to claim 8, wherein the wedge-shaped member is slidably and retentatively coupled to both the contact element and the stationary base member so that retraction of the wedge-shaped member causes the contact element to be retracted.

* * * * *